United States Patent [19]
Madey

[11] Patent Number: 5,623,358
[45] Date of Patent: Apr. 22, 1997

[54] DISCRIMINATING INFRARED SIGNAL DETECTOR AND SYSTEMS UTILIZING THE SAME

[76] Inventor: Julius M. J. Madey, 601 Country Rte. 21, Hillsdale, N.Y. 12529

[21] Appl. No.: 496,970

[22] Filed: Jun. 30, 1995

[51] Int. Cl.$^6$ ................................................. H04B 10/00
[52] U.S. Cl. ..................... 359/172; 359/153; 250/214 AL
[58] Field of Search .................................... 359/172, 152, 359/153, 113; 250/214 AL, 214 B, 214 DC; 356/141; 340/825.72

[56] References Cited

U.S. PATENT DOCUMENTS

| | | | |
|---|---|---|---|
| 4,648,131 | 3/1987 | Kawaguchi et al. | 359/152 |
| 4,977,619 | 12/1990 | Crimmins | 359/172 |
| 5,012,086 | 4/1991 | Barnard | 250/222.1 |
| 5,027,433 | 6/1991 | Menadier et al. | 359/154 |
| 5,095,382 | 3/1992 | Abe | 359/189 |
| 5,455,702 | 10/1995 | Reed et al. | 359/152 |
| 5,495,357 | 2/1996 | Osterhout | 359/152 |

OTHER PUBLICATIONS

Talking Signs—Brochure—3 pages—Undated.
Talking Signs, Inc.—"Overview"—1 page and Accessible City Project, San Francisco—1 page —All undated.
Letter from City and County of San Francisco—1 page—Dated Mar. 1, 1993.
Talking Signs, Inc.—"For Immediate Release"—1 page—Undated.
"Winning Solutions"—1994 PTI Technology Achievement Awards—Brochure—2 pages—Undated.
Excerpt from San Francisco Examiner—Bill Mandel Column—1 pg.—Present copy Undated.
Smith–Kettlewell Eye Research Institute, Bart & Muni—News Release—3 pages—Sep. 9, 1994.
Article from The Urban Transportation Monitor—1 page—Sep. 30, 1994.
Reprint from Identity Magazine—4 pages—Reprinted from Mar./Apr. 1994 issue.
The Beach News, vol. 9, No. 2, p. 5—1 page—Jan. 12, 1995.
Excerpt from San Francisco Examiner—"New aid for the blind"—1 page—Present copy Undated.
Newspaper article "Clearing way for blind"—1 page—Present copy Undated.
Apparent excerpt from Identity Magazine "A Light in the Darkness"—1 page—Present copy Undated.
Excerpt from Cape Cod Times "High–tech signs 'talk' to blind"—1 page—Oct. 6, 1994.
Excerpt from Manchester Evening News "Bosses help by talking shop"—1 page—Nov. 6, 1993.
Talking Signs, Inc.—Technical Data Sheet—1 page—Undated.
Report: Smith–Kettlewell Eye Research Institute, Rehabilitation Engineering Center—11 pages—Mar. 15, 1991.
Paper entitled "Infrared Remote Signage Application for Transit Accessibility"—3 pages—Undated.
Letter—Royal National Institute for the Blind—1 page—Jan. 16 1995.
Resolution of American Council of the Blind—1 page—Approved Jul. 6, 1990.
Resolution of Board of Supervisors of San Francisco—3 pages (on 2 sheets)—Approved Apr. 24, 1992.
Brochure headed "Talking Signs® . . . they speak for themselves"—8 pages—Copyright 1994.

Primary Examiner—Wellington Chin
Assistant Examiner—Rafael Bacares
Attorney, Agent, or Firm—John F. Sieberth

[57] ABSTRACT

Described is a portable directional receiver. It comprises a non-visual communicator, a self-contained source of electrical energy, a detector for receiving a sensed continuous frequency modulated infrared signal, and electronics converting the sensed signal into intelligible non-visual communication emanating from the communicator both in the presence and in the absence of an ambient background of light energy, such as sunlight. The device is adapted for use by the visually impaired in finding desired locations from which suitable modulated infrared signals are continuously emitted.

9 Claims, 6 Drawing Sheets

RECEIVER FRONT END BLOCK DIAGRAM

TRF FM RECEIVER WITH NOISE OPERATED SQUELCH BLOCK DIAGRAM

RECEIVER FRONT END SCHEMATIC DIAGRAM

TRF FM RECEIVER WITH NOISE OPERATED SQUELCH SCHEMATIC DIAGRAM

TRF FM RECEIVER WITH NOISE OPERATED SQUELCH SCHEMATIC DIAGRAM

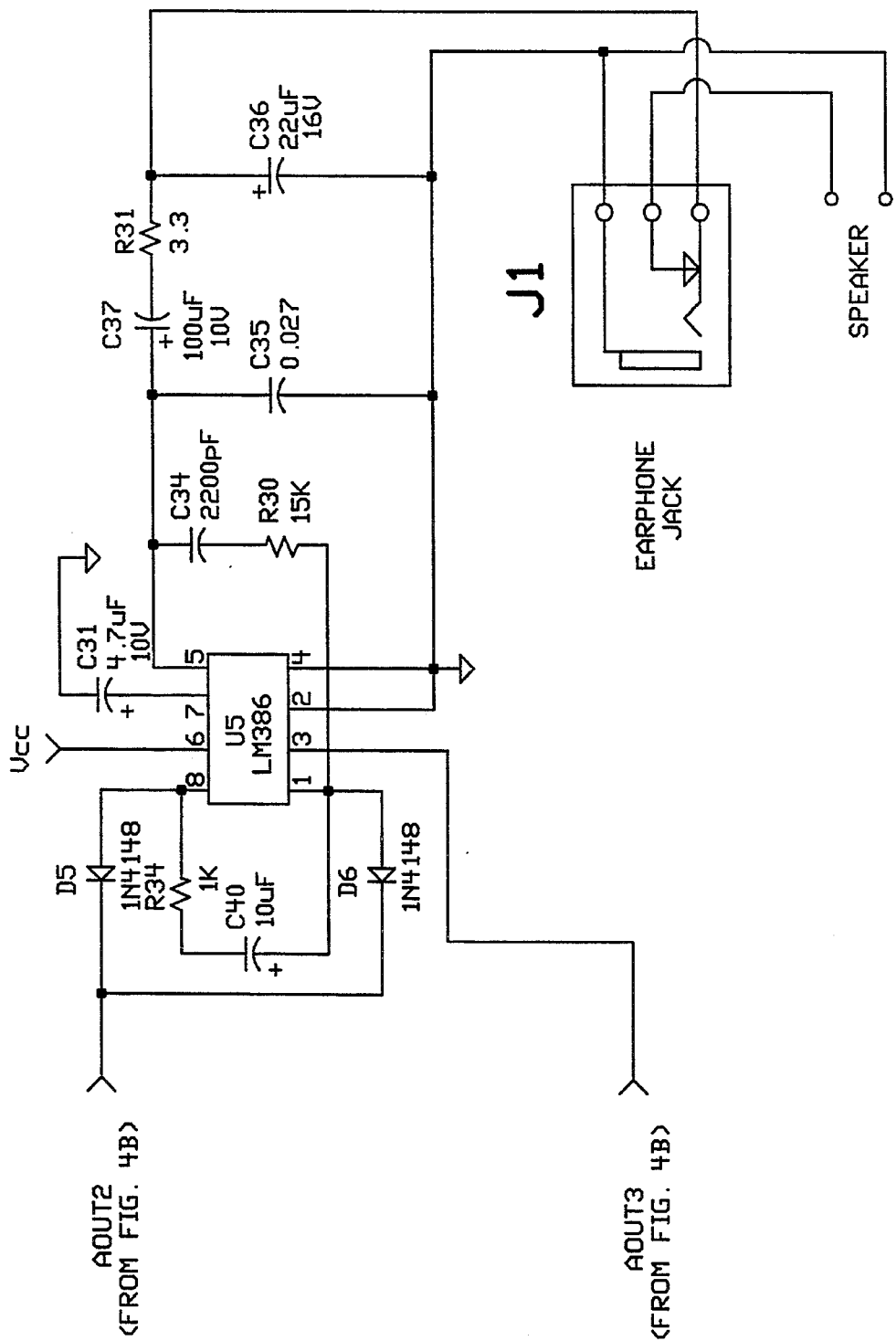
Fig. 4C  TRF FM RECEIVER WITH NOISE OPERATED SQUELCH SCHEMATIC DIAGRAM

ость5,623,358

DISCRIMINATING INFRARED SIGNAL DETECTOR AND SYSTEMS UTILIZING THE SAME

TECHNICAL FIELD

This invention relates to improvements in the art of optoelectronics, and more particularly to an improved detector and detection method for lightwave signals, especially infrared signals, in the presence of an ambient background of light energy such as sunlight.

BACKGROUND

Until relatively recently, persons who are blind, have low vision or are learning disabled or otherwise print handicapped are denied access and orientation that the general population takes for granted in every day life. Finding their way is a challenging event often ending with asking strangers' help. Whether getting on the right bus, finding a restroom or a telephone, determining directions to elevators or exits, crossing streets or understanding directories in public places, these populations are placed at a great disadvantage and often in danger. Directional "wayfinding" devices have not existed to provide them the ability to "read and see" remote signs.

In recent years an information and wayfinding system has been developed for assisting blind, low-visioned and otherwise print-handicapped individuals. The system, marketed under the trademark Talking Signs, consists of infrared transmitters and receivers. Transmitters are placed on key signs in the environment which continually transmit the message of the sign. The receiver is carried by the person who activates it when direction or information is desired.

Under many circumstances, the foregoing system provides excellent results in use. However when used in the presence of an ambient background of light energy such as sunlight, difficulties may be encountered, such as difficulty or, possibly, inability to detect the intended signal. Thus a need exists for a way of nullifying the adverse effect of such background light energy so that detection units can be utilized effectively both in the presence and in the absence of an ambient background of intense light energy such as sunlight.

This invention is deemed to fulfill this need in a highly efficient manner.

SUMMARY OF THE INVENTION

In one of its embodiments, this invention provides a portable directional receiver which comprises a non-visual communicator (e.g., a speaker), a self-contained source of electrical energy, a detector for receiving a sensed continuous frequency modulated infrared signal, and electronics converting said sensed signal into intelligible communication (e.g., speech) emanating from said communicator both in the presence and in the absence of an ambient background of light energy. Such background energy can even be sunlight.

Another embodiment provides a system which comprises:

a) an array of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers; and b) a portable directional receiver which comprises a non-visual communicator (e.g., a speaker), a self-contained source of electrical energy, first means for detecting, receiving and converting said continuous frequency modulated infrared signal into intelligible speech or other non-visual intelligible means of communication from said communicator, and second means for nullifying the adverse effect of ambient background light energy, including sunlight.

These and other embodiments and features of this invention will be still further apparent from the ensuing description, appended claims and accompanying drawings.

BRIEF DESCRIPTION OF THE DRAWINGS

FIGS. 4A, 4B and 4C, taken together, are a detailed schematic diagram of the electronics of a means in the receiver for filtering and detecting the received signal and for squelching interference from ambient background noise.

DESCRIPTION OF PREFERRED EMBODIMENTS

The receivers of the invention are especially adapted for use with an array of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers. These emitters can be placed at suitable locations so that a sight-impaired user of the receiver can sense the signal and be led to the desired location by intelligible communication generated in the receiver.

The non-visual communicator of the directional receiver can be of various types such as a Morse code cell, a tactile braille communicating device or any other electromechanical conversion device. Preferably however it is a small audio speaker or earphone system. When the communicator is an audio or earphone speaker system, the electronics of the receiver converts the sensed signal into intelligible speech emanating from the speaker system by converting the signal into an amplified time-varying detector signal photocurrent and delivering the amplified photocurrent to the speaker system to actuate the same.

As the self-contained source of electrical energy, the receiver will usually include one or more small electrical batteries. However, a suitable photovoltaic cell system for converting light energy into electrical energy for the receiver may be employed.

Figure 1:
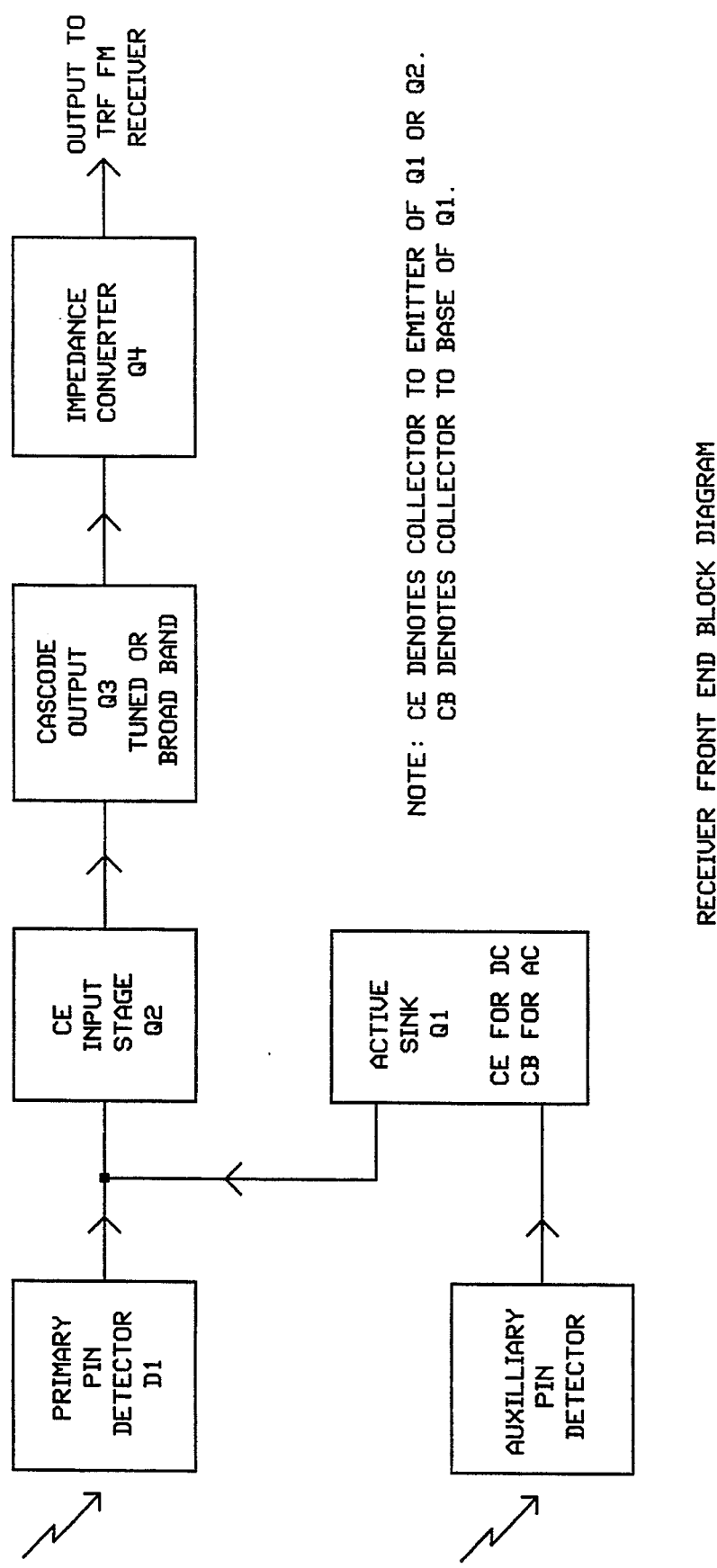
FIG. 1 is a block diagram of a typical front end (signal sensing and receiving portion) of a receiver of this invention.

Referring now to FIG. 1, a signal from the array of single channel emitters combined with ambient background radiation is received by primary PIN detector, D1. A auxiliary PIN detector, D2, receives ambient background radiation and cancels the ambient noise signal from primary PIN detector, D1, using active sink network of Q1. In essence, shot noise current due to the main PIN photodiode, the active sink and the auxiliary PIN photodiode are noncoherent and sum root mean square, while signal currents from the main and auxiliary PIN photodiodes are coherent and sum directly. Further, over a given design range, the steady state photocurrent of the auxiliary PIN photodiode does not contribute to the active sink current and, hence, does not produce additional shot noise in the active sink. The device of the figures thus utilizes a circuit topology in which the main PIN photodiode, D1, is operated in the reverse bias or photoresistive mode and the auxiliary PIN photodiode, D2, is operated in the photovoltaic mode. The active sink is typically a plurality of semiconductor devices such as transistors or integrated circuits. Further signal conditioning and amplification is provided by input stage Q2, cascode output Q3 and impedance converter Q4, respectively.

Figure 2:
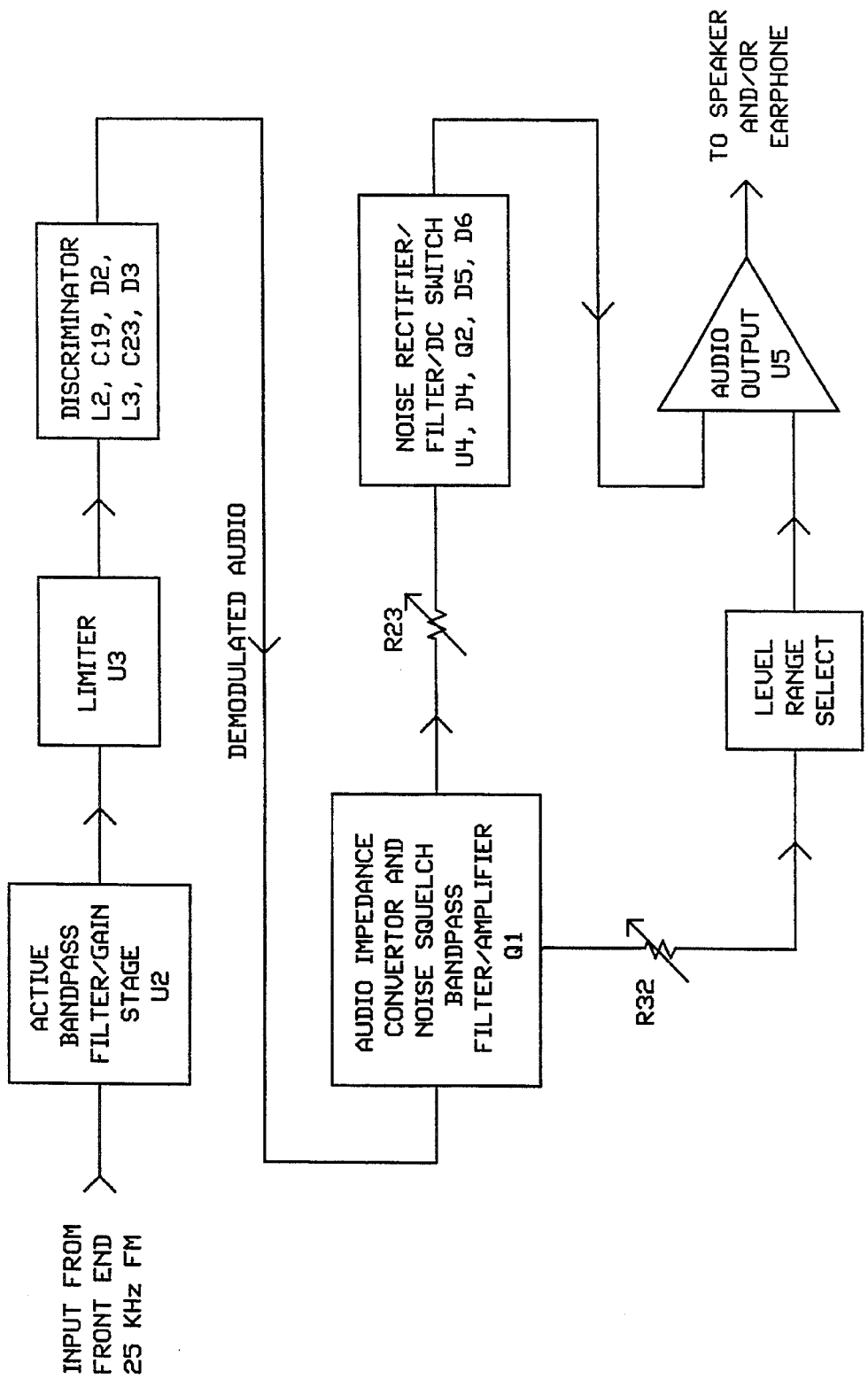
FIG. 2 is a block diagram of a means in the receiver for filtering and detecting the received signal and for squelching interference from ambient background noise.
Figure 3:
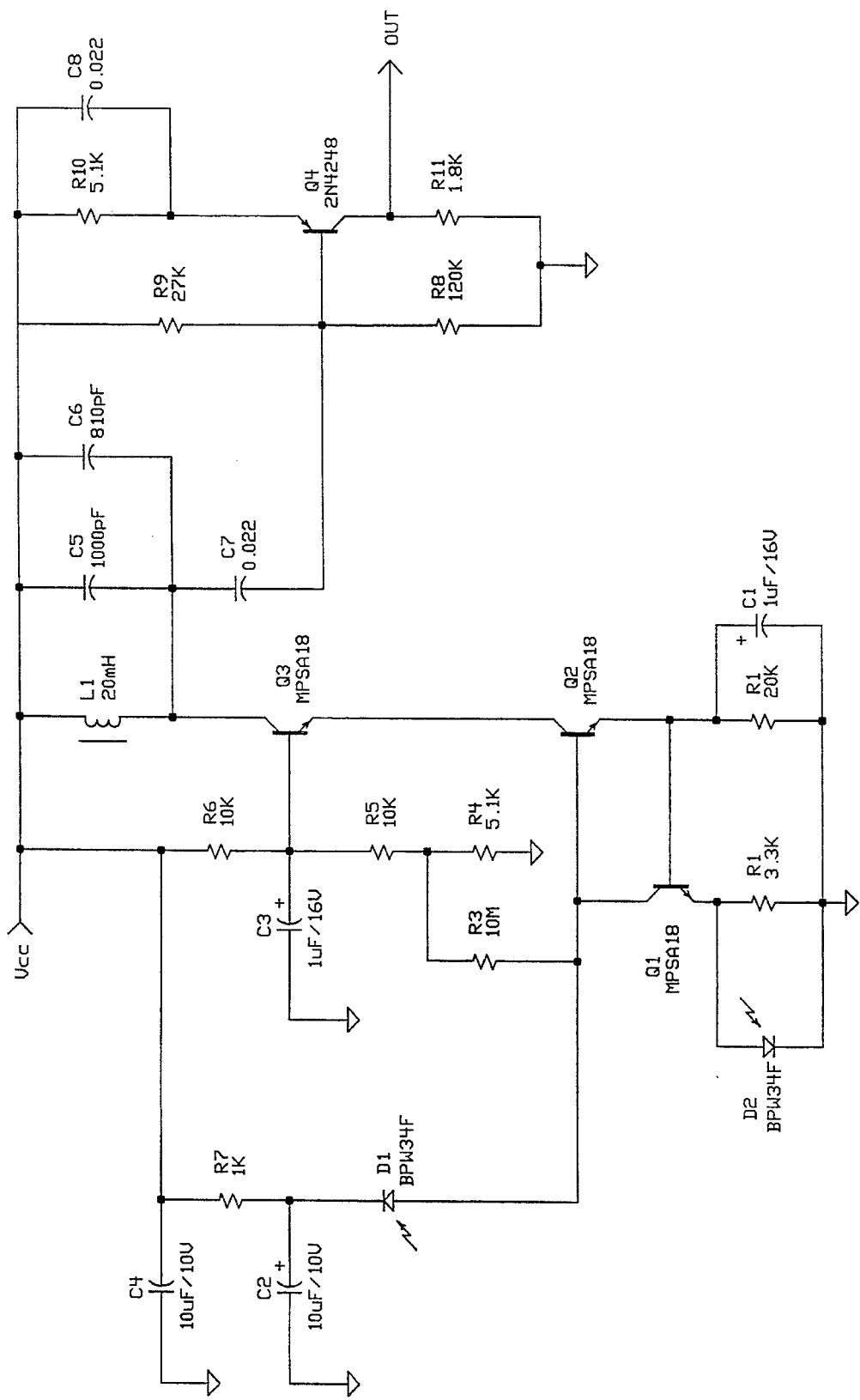
FIG. 3 is a detailed schematic diagram of the electronics of the front end of a typical receiver of this invention.
Figure 4A:
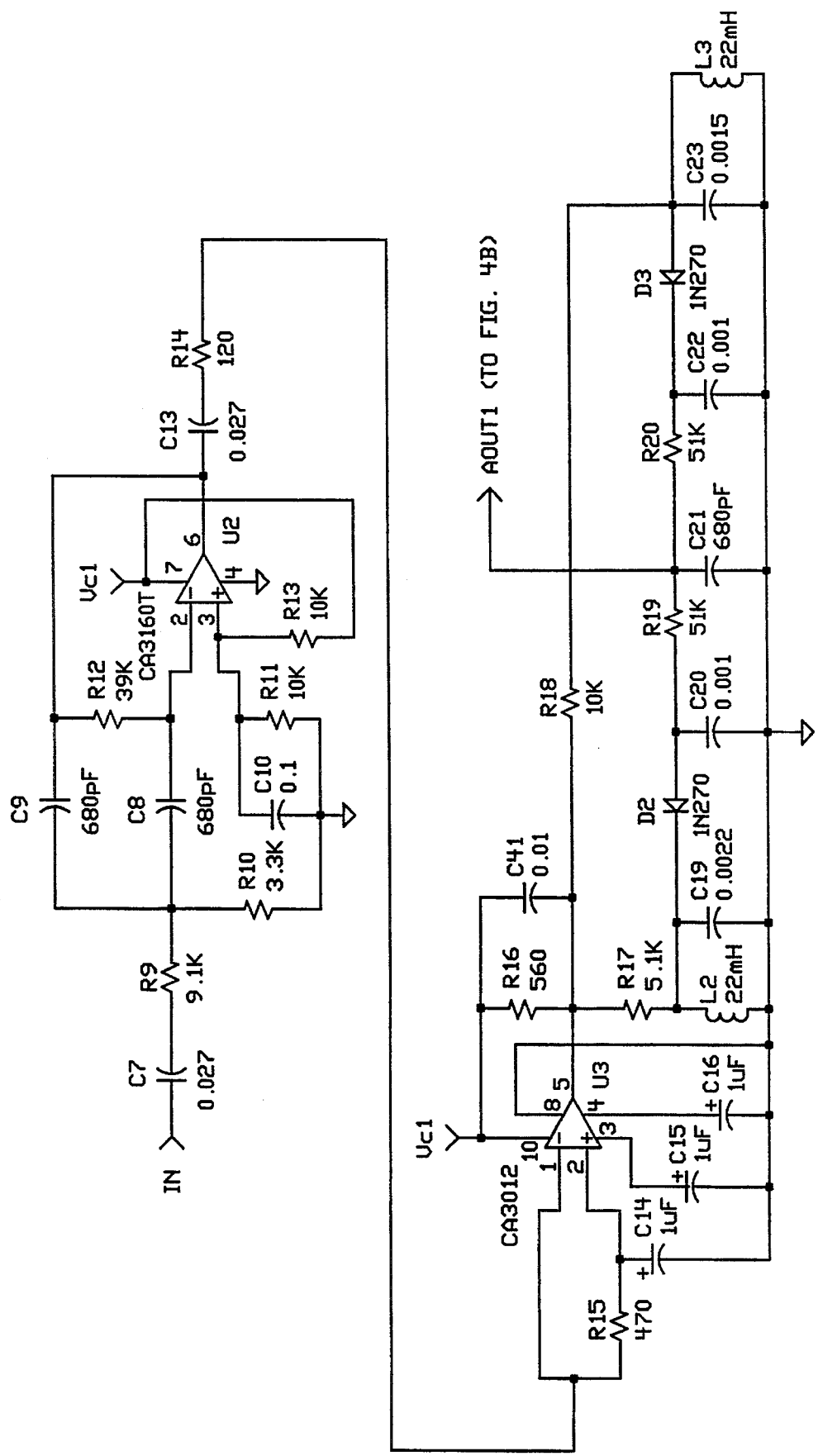

The output from the impedance converter, Q4, is then directed to the TRF FM receiver of FIG. 2. The resulting signal is conditioned by active bandpass filter/gain stage U2, limiter U3, and discriminator network made up of L2, C19, D2, L3, C23, and D3 (see FIG. 4A) which produces a demodulated audio signal. The demodulated audio signal is further conditioned by the audio impedance convertor and noise squelch bandpass filter/amplifier network of Q1 (see FIG. 4A for details of the network). Two signals are generated by the network of Q1 of FIGS. 2 and 4B.

Figure 4B:
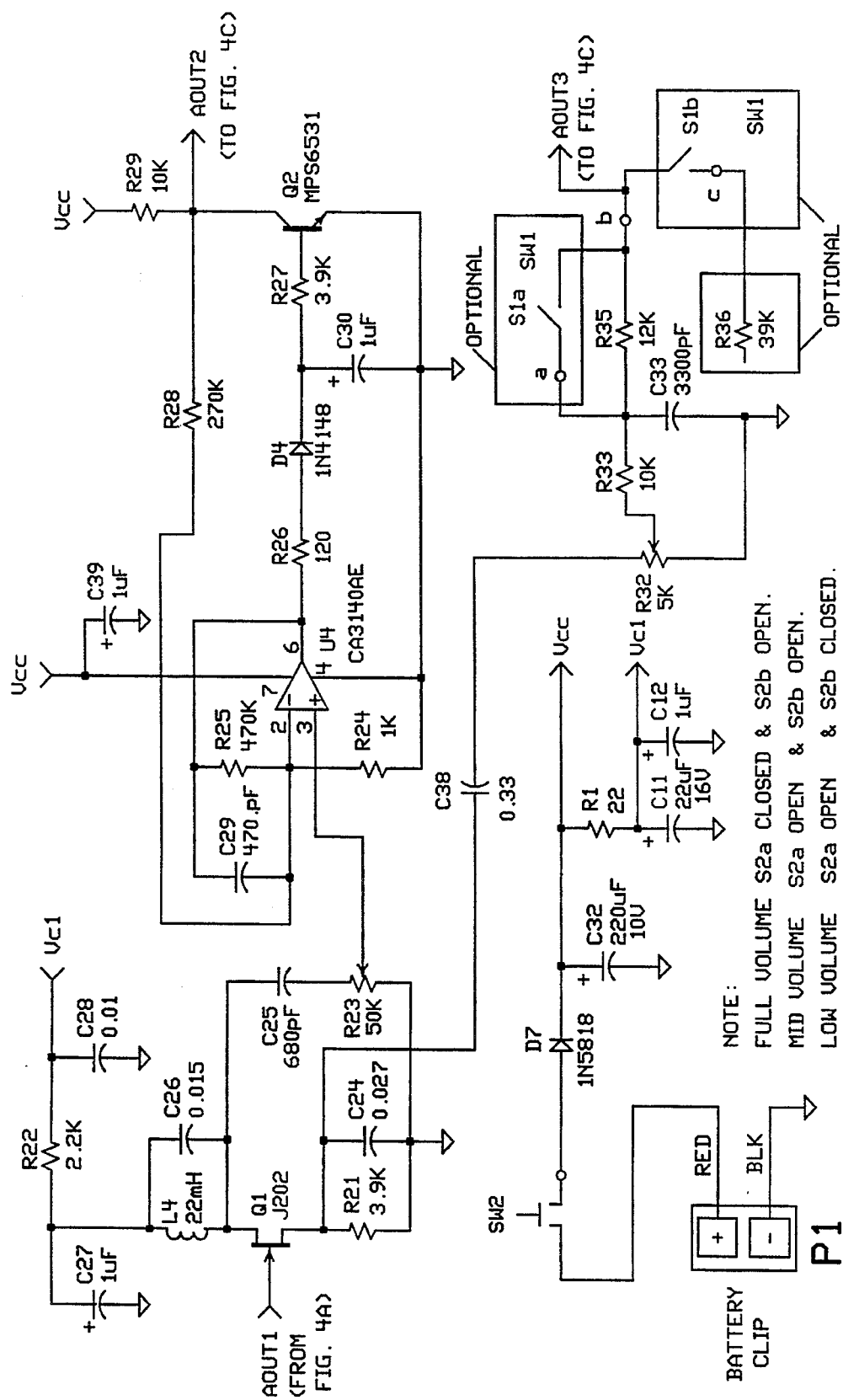

The first signal from Q1 of FIGS. 2 and 4B is a noise squelch signal which is directed via potentiometer R23 to the noise rectifier/filter/DC switch U4, D4, Q2, D5, and D6 (see FIGS. 4B and 4C for details of this network). The output of the noise rectifier/filter/DC switch which delivers the noise squelch level is then directed to the audio output amplifier U5.

The second signal from Q1 of FIGS. 2 and 4B is directed to a level range select network via potentiometer R32. The output from the level range select network is then directed to the audio output amplifier U5. The output from the audio output amplifier U5 is then used to actuate the speaker or other non-visual communicator.

Complete details concerning the electronic circuitry referred to in FIGS. 1 and 2 are set forth in FIGS. 3 and 4A–4C, respectively.

A feature of this invention is that the electronics includes an active sink (e.g., broad band semiconductor devices) for ambient light-induced steady-state detector photocurrent which effectively removes the noise of ambient background noise resulting from ambient background of light energy such as sunlight. The device is therefore capable of detecting a signal that approaches the shot noise detection limit of a PIN photodiode in the presence of a steady state photocurrent. In doing so the device in the form depicted in the figures converts the sensed signal from the array of single channel emitters into intelligible speech emanating from the speaker by converting the signal into an amplified time-varying detector signal photocurrent and delivering the amplified photocurrent to the speaker to actuate the same.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

What is claimed is:

1. A portable directional receiver which comprises a non-visual communicator, a self-contained source of electrical energy, a detector for receiving a sensed continuous frequency modulated infrared signal, and electronics comprising an active sink for ambient light-induced steady state detector photocurrent, a primary PIN photodiode operated in the photoresistive mode, and a secondary PIN photodiode operated in the photovoltaic mode, said electronics converting said sensed signal into intelligible non-visual communication emanating from said communicator both in the presence and in the absence of an ambient background of light energy, and said receiver being effective as said sensed signal approaches the shot noise detection limit of said primary PIN photodiode in the presence of a steady state photocurrent.

2. A receiver according to claim 1 wherein said communicator is an audio or earphone speaker system and said electronics converts said sensed signal into intelligible speech emanating from said speaker system by converting said signal into an amplified time-varying detector signal photocurrent and delivering said amplified photocurrent to said speaker system to actuate the same.

3. A receiver according to claim 2 wherein said active sink comprises broad band semiconductor devices.

4. A receiver according to claim 3 wherein said semiconductor devices are included within an integrated circuit.

5. A receiver according to claim 1 wherein said communicator is an audio speaker.

6. A portable directional receiver which comprises a speaker, a self-contained source of electrical energy, a detector comprising a PIN photodiode operated in the photoresistive mode for receiving a sensed continuous frequency modulated infrared signal, electronics converting said sensed signal into intelligible speech emanating from said speaker, and a PIN photodiode operated in the photovoltaic mode for nullifying ambient light-induced steady-state detector photocurrent derived from ambient background light energy.

7. A system which comprises:

a) an array of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers; and b) a portable directional receiver which comprises a non-visual communicator, a self-contained source of electrical energy, first means for detecting, receiving and converting said continuous frequency modulated infrared signal into intelligible non-visual communication emanating from said communicator, and second means for nullifying the adverse effect of ambient background light energy, said second means further comprising an active sink for ambient light-induced steady state detector photocurrent and a PIN photodiode operated in the photovoltaic mode.

8. A system according to claim 7 wherein said first means comprises a PIN photodiode operated in the photoresistive mode for detecting and receiving said continuous frequency modulated infrared signal.

9. A system according to claim 8 wherein said first means converts said signal into intelligible speech.

* * * * *